United States Patent [19]

Gartside, III et al.

[11] Patent Number: 4,701,016
[45] Date of Patent: Oct. 20, 1987

[54] THIXOTROPIC GREASE COMPOSITION AND CABLE COMPRISING SAME

[75] Inventors: Charles H. Gartside, III, Lilburn; Alvin C. Levy, Atlanta; Bob J. Overton; Carl R. Taylor, both of Lawrenceville, all of Ga.

[73] Assignee: American Telephone and Telegraph Company, AT&T Bell Laboratories, Murray Hill, N.J.

[21] Appl. No.: 697,054

[22] Filed: Jan. 31, 1985

[51] Int. Cl.$^4$ .......................... G02B 6/44; H01B 7/00; H02G 15/00; B01J 13/00

[52] U.S. Cl. ................. 350/96.23; 350/96.10; 174/70 R; 174/110 SR; 174/118; 523/173; 252/315.01; 252/315.4; 252/315.5

[58] Field of Search ............... 350/96.10, 96.23, 96.34; 174/110 SR, 110 B, 110 N, 110 FC, 110 S, 110 F, 110 E, 120 SR, 121 SR, 118, 70 R; 252/9, 21, 43, 315.01, 315.1, 315.2, 315.5, 315.6; 523/173

[56] References Cited

U.S. PATENT DOCUMENTS

| | | | |
|---|---|---|---|
| 3,714,041 | 1/1973 | Asgeirsson | 252/13 |
| 3,996,413 | 12/1976 | Foord et al. | 252/315.2 X |
| 4,265,775 | 5/1981 | Aakalu et al. | 252/573 |
| 4,331,379 | 5/1982 | Oestreich et al. | 350/96.23 |
| 4,333,706 | 6/1982 | Davis et al. | 350/96.23 |
| 4,370,023 | 1/1983 | Lange et al. | 350/96.23 |
| 4,375,521 | 3/1983 | Arnold | 523/173 |
| 4,396,514 | 8/1983 | Randisi | 250/30 |
| 4,464,013 | 8/1984 | Sabia | 350/96.23 |
| 4,497,538 | 2/1985 | Patel | 350/96.23 |
| 4,509,821 | 4/1985 | Stenger | 350/96.23 |
| 4,645,298 | 2/1987 | Gartside, III | 350/96.23 |

FOREIGN PATENT DOCUMENTS 2946027 5/1981 Fed. Rep. of Germany ... 350/96.23

OTHER PUBLICATIONS

*Optical Fiber Telecommunications,* Academic Press, New York, 1979, by S. E. Miller et al, pp. 158–161.

*Primary Examiner*—William L. Sikes
*Assistant Examiner*—Brian M. Healy
*Attorney, Agent, or Firm*—Eugen E. Pacher

[57] ABSTRACT

A grease composition comprising oil, colloidal particle filler, and, optionally, a bleed inhibitor is disclosed. The grease typically has a critical yield stress below 140 Pa at 20° C., preferably below 70 or 35 Pa. The grease can advantageously be used as a cable filling material, especially for optical fiber cable. In the latter case it can result in cable having substantially no cabling loss. Preferred compositions comprise 77 to 95% b.w. of ASTM type 103, 104A, or 104B paraffinic or naphthenic oil, or polybutene oil; 2 to 15% b.w. of hydrophobic or hydrophilic fused silica; and optionally, up to 15% b.w. of styrene-rubber or styrene-rubber-styrene block copolymer, or semiliquid rubber.

11 Claims, 7 Drawing Figures

THIXOTROPIC GREASE COMPOSITION AND CABLE COMPRISING SAME

FIELD OF THE INVENTION

This invention pertains to colloidal particle-filled grease compositions, and to articles comprising the composition. Among the articles are communications cables, especially optical fiber cables.

BACKGROUND OF THE INVENTION

Greases play an important role in technology, and are frequently used as lubricating substances. However, greases also find nonlubricating use, for instance, as cable filling compounds.

A grease typically is a solid or semiliquid substance comprising a thickening or gelling agent in a liquid carrier. The gelling agents used in greases frequently are fatty acid soaps, but high melting point materials, such as clays, silica, organic dyes, aromatic amides, and urea derivatives are also used. Nonsoap thickeners are typically present as relatively isometric colloidal particles. For instance, fumed silica particles typically are substantially spherical, and some clay particles tend to be plate-like. All types of gelling agents form a network structure in which the carrier is held by capillary forces.

When a low stress is applied to a sample of grease, the material acts substantially solid-like. If the stress is above a critical value, then the material flows and the viscosity decreases rapidly. The decrease in viscosity is largely reversible since it is typically caused by the rupture of network junctions between the filler particles, and these junctions can reform following the release of the supercritical stress.

A desirable property of a grease is the absence of syneresis, i.e., its ability to retain uniform consistency. Generally, syneresis is controlled by assuring dispersion of an adequate amount of colloidal particles or other gelling agent. Other desirable properties of grease compositions, such as oxidation resistance, are achieved or enhanced by means of appropriate additives.

The prior art knows greases filled with colloidal silica and other colloidal particles. For instance, U.S. Pat. No. 3,714,041 discloses organic liquids thickened with pyrogenic silica, silica aerogels, and fibrous asbestos. U.S. Pat. No. 4,396,514 discloses a lubricating composition comprising fumed silica. U.S. Pat. No. 4,265,775 discloses a nonbleeding thixotropic thermally conductive material comprising a silicone liquid carrier, silica fibers, and a thermally conductive filler powder.

Grease compositions have been used as cable filling material. In conventional (electrical) communications cables, filling compounds primarily serve to prevent water ingress into, and water propagation inside, the cable. In optical fiber cables, a further important function of a filling compound is the maintenance of the optical fibers in a low stress state.

Among known cable filling compounds are oilextended rubbers and petrolatum. For an example of the former, see, U.S. Pat. No. 4,464,013, incorporated herein by reference, and of the latter, U.S. Pat. No. 4,333,706. The latter patent discloses a filling compound comprising a petrolatum base material and inorganic microspheres.

A cable filling compound, especially an optical fiber cable filling compound, should meet a variety of requirements. Among them is the requirement that the physical properties of the cable remain within acceptable limits over a rather wide temperature range, e.g., from about $-40$ to about $76°$ C. It is also desirable that the compound be substantially free of syneresis over the temperature range. Filling compounds for use in optical fiber cables also should have a relatively low shear modulus. According to the prior art, the shear modulus is a critical material parameter of optical fiber cable filling compounds, since it is believed to be directly related to the amount of microbending loss of fiber in filled cable. For a discussion of microbending loss, see *Optical Fiber Telecommunications*, S. E. Miller et al, Academic Press, New York (1979), pp. 158-161.

Typically, microbending loss is more difficult to control at long wavelengths than at short ones. Thus the requirements on the mechanical properties of a fiber cable filling compound are typically substantially more severe for cable that is to be used at, e.g., 1.55 $\mu$m than they are if the cable is to be used at shorter operating wavelengths, e.g., at 1.3 $\mu$m. Although we have found that some prior art filling compounds perform quite satisfactorily at wavelengths up to about 1.3 $\mu$m, we have also found that this is often not the case at longer wavelengths.

Because silica-based optical fibers typically have their lowest losses at or near 1.55 $\mu$m wavelength, there is great interest in eventually operating optical fiber telecommunication systems at approximately that wavelength. Thus, it is important to have available the means for producing optical fiber cable that has no significant cabling-induced losses at long wavelengths, including at about 1.55 $\mu$m. We are disclosing herein a novel grease composition that has properties which make it useful as, inter alia, an optical fiber cable filling compound for cable operating at about 1.55 $\mu$m.

SUMMARY OF THE INVENTION

We have invented a substantially nonbleeding grease composition having low shear modulus. It also has low critical yield stress, a parameter which, we have discovered, has a significant effect on microbending loss in optical fiber cable.

The composition comprises oil, a gelling agent such as colloidal particles, and, optionally, a bleed inhibitor. Among oils useful in the practice of the invention are ASTM type (ASTM D-226 test) 103, 104A, or 104B (or mixtures thereof) naphthenic or paraffinic oils having a minimum specific gravity of about 0.860 and a maximum pour point (ASTM D97) of less than approximately $-4°$ C., and polybutene oils of minimum specific gravity of about 0.83 and a maximum pour point (ASTM D97) of less than about 18° C. The colloidal particle filler material preferably comprises silica particles, e.g., fumed silica. Preferred bleed inhibitors are styrene-rubber or styrene-rubber-styrene block copolymers, and/or semiliquid rubbers, such as a high viscosity polyisobutylene. Block copolymers and semiliquid rubbers will be referred to collectively as "rubber polymers". Other ingredients, e.g., a thermal oxidative stabilizer, may optionally be present.

Incorporating a rubber polymer into the grease composition allows reduction of the amount of colloidal particles that has to be added to the mixture to prevent syneresis of the gel. This reduction can result in cost saving, as compared to prior art grease compositions of the type considered herein. Furthermore, it makes possible formulation of nonbleeding compositions having very low critical yield stress.

Typically, grease compositions according to the invention comprise at least about 77 percent by weight (b.w.) oil (or mixture of oils), and between about 4 and about 15% b.w., preferably at most 10%, colloidal particles (typically having a BET surface area of about 50 to about 400 m$^2$/gm) Rubber polymer-containing compositions typically contain less than about 5% b.w. rubber block copolymer (or mixture of such copolymers), or, alternatively, less than about 15% b.w. semiliquid rubber. Rubber block copolymers useful in the practice of the invention have a styrene/rubber ratio between about 0.1 and about 0.8, and a molecular weight, as indicated by viscosity in toluene at 25° C., of from about 100 cp in a 20% b.w. rubber solution to about 2000 cp in a 15% b.w. rubber solution. Polyisobutylene and other semiliquid rubbers useful in the practice of the invention have a Flory molecular weight between about 20,000 and about 70,000 and typically flow slowly under their own weight at 20° C. The Brookfield viscosity at 60° C. is typically above about 30,000 poise. A preferred colloidal material is fumed silica, preferably with a coating which renders the silica material hydrophobic.

Compositions according to the invention can advantageously be used as optical fiber cable filling compounds. At least in some cases, it is desirable that such filling compounds have a critical yield stress of less than about 70 Pa at 20° C. Optical fiber cable, including single mode optical fiber ribbon cable, using such low yield stress filling compound can have very low microbending loss, even at long wavelengths such as 1.55 μm. A single mode fiber ribbon cable is disclosed in concurrently filed U.S. patent application designated Ser. No. 697,005 filed 1/31/85 entitled "Single Mode Optical Fiber Ribbon Cable."

Figure 1:
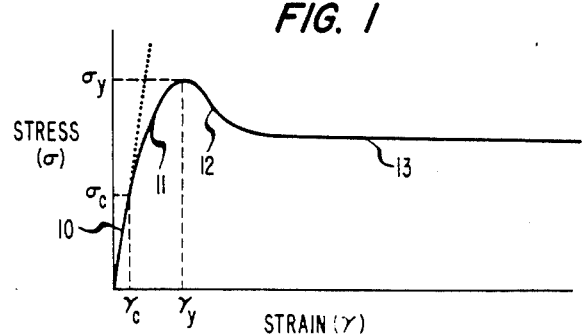
FIG. 1 shows a generalized stress/strain curve of thixotropic material.
Figure 2:
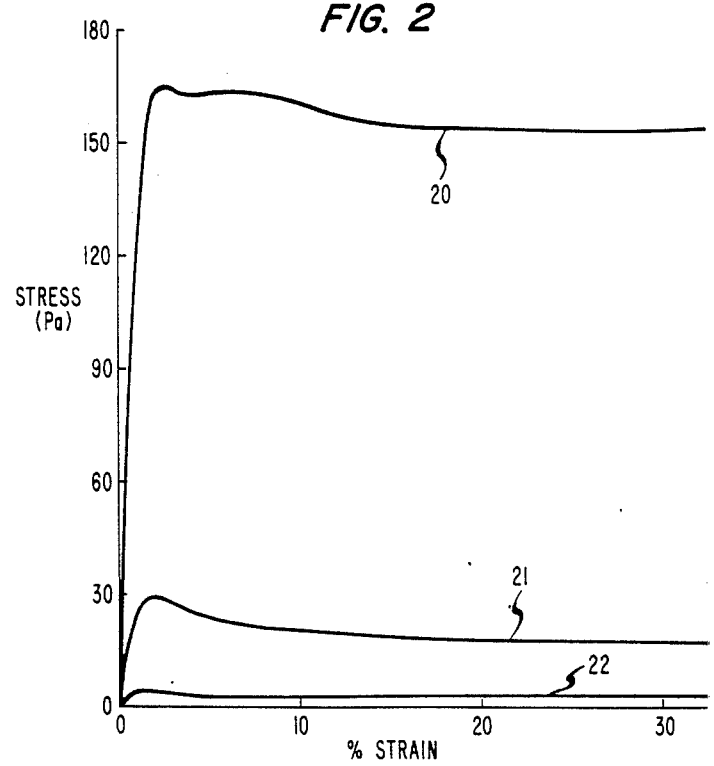
FIG. 2 shows stress/strain curves of a prior art grease and of two exemplary compositions according to the invention.
Figure 3:
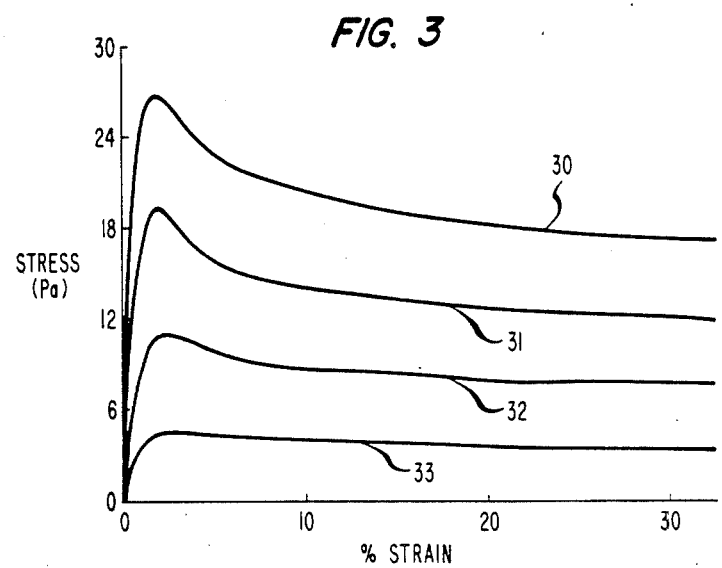
FIG. 3 shows stress/strain curves for four exemplary grease compositions of varying filler content.

The stress/strain curves of FIGS. 1-3 are constant strain rate curves.

DETAILED DESCRIPTION

In a broad aspect the invention is a grease composition of matter having low critical yield stress, and articles comprising such a composition. In another aspect the invention is a filled grease composition having low oil syneresis, and articles comprising such a composition. Exemplary of articles comprising the inventive composition is an optical fiber cable, e.g., a single mode optical fiber ribbon cable. However, it is anticipated that its combination of properties will make the novel composition of matter useful in other applications also.

The inventive composition comprises at least two major components, namely, oil and a colloidal filler, and frequently also a third major component, a bleed inhibitor. The latter can be either a rubber block copolymer, a high viscosity semiliquid (also referred to as "semisolid") rubber, or other appropriate rubber. These components will now be discussed in detail.

Among the oils useful in the practice of the invention are polybutene oils having a minimum specific gravity of about 0.83 and a maximum pour point (ASTM D97) of less than about 18° C., or ASTM type 103, 104A, 104B (or mixtures thereof) naphthenic or paraffinic oils having a minimum specific gravity of about 0.86, and a maximum pour point (ASTM D97) of less than about −4° C. Specific examples of oils useful in the practice of the invention are a polybutene oil (a synthetic hydrocarbon oil having a pour point per ASTM D97 of −35° C., SUS viscosity 1005 at 99° C., specific gravity 0.8509, average molecular weight 460) available from Amoco Chemical Corporation, Tex. City, Tex., under the trade designation L-100; and a white mineral oil (pour point per ASTM D97 of −25° C., SUS viscosity 53.7 at 99° C., average specific gravity 0.884, maximum aromatic oils 1% b.w.) available from Penreco, Butler, Pa., under the trade designation Drakeol 35. Other oils which are expected to be useful in the practice of the invention are triglyceride-based vegetable oils such as castor oil and other synthetic hydrocarbon oils such as polypropylene oils. For applications requiring fire-retardant properties (e.g., fiber cables for use on customer premises), chlorinated paraffin oils having a chlorine content of about 30–75% b.w. and a viscosity at 25° C. of between 100 and 10,000 cps are useful. An example of such oil is Paroil 152, available from Dover Chemical Company of Dover, Ohio. Polymerized esters of acrylic acid or similar materials are useful as pour-point depressants at addition levels below 5% b.w. An example is ECA 7955, available from Exxon Chemical Company.

Among the colloidal fillers useful in the practice of the invention is colloidal silica, either hydrophilic or hydrophobic, preferably a hydrophobic fumed silica having a BET surface area between about 50 and about 400 m$^2$/gm. An example of a hydrophobic fumed silica useful in the practice of the invention is a polydimethylsiloxane-coated fumed silica having a BET surface area of about 80–120 m$^2$/gm, containing about 5% b.w. carbon, available from the Cabot Corporation of Tuscola, Ill., under the trade designation Cab-O-Sil N70-TS. An exemplary hydrophilic colloidal material is fumed silica with a BET surface area of about 175–225 m$^2$/gm, nominal particle size 0.012 μm, specific gravity 2.2, available from the Cabot Corporation under the trade designation Cab-O-Sil M-5. Other colloidal fillers useful in the practice of the invention are precipitated silicas and clays such as bentonites, with or without surface treatment.

Among the rubber block copolymers that can advantageously be used in compositions according to the invention are styrene-rubber and styrene-rubber-styrene block copolymers having a styrene/rubber ratio between approximately 0.1 and 0.8. Exemplary block rubbers are a) styrene-ethylene propylene block copolymer (SEP) having a styrene/rubber ratio of about 0.59, unplasticized, specific gravity about 0.93, break strength (ASTM D-412) 300 psi, available from Shell Chemical Company of Houston, Tex., under the trade designation Kraton G 1701; (b) styrene-ethylene butylene block copolymer (SEB), styrene/rubber ratio about 0.41, obtained from the Shell Chemical Company under the designation TRW-7-1511;(c) styrene-ethylene butylene-styrene block copolymer (SEBS), styrene/rubber ratio about 0.16, unplasticized, specific gravity about 0.90, 750% elongation, 300% modulus (ASTM D-412) 350 psi, available from Shell Chemical Corporation under the trade designation Kraton G 1657. Other styrene-rubber or styrene-rubber-styrene block copolymers expected to be useful in the practice of the invention are styrene-isoprene rubber (SI) and styrene-isoprene-styrene (SIS) rubber, styrene-butadiene (SB) and styrene-butadiene-styrene (SBS) rubber. An example of SIS is Kraton D 1107, and an example of SBS is Kraton D 1102, both available from Shell Chemical Company.

Among the semiliquid rubbers that we have found useful in the practice of the invention are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, available from Exxon Chemical Company of Houston, Tex. under the trade designation Vistanex LM-MS. Other rubbers which are considered to be useful in the practice of the invention are butyl rubber, ethylene-propylene propylene rubber (EPR), ethylene-propylene dimer rubber (EPDM), and chlorinated butyl rubber having a Mooney viscosity, ML 1+8 at 100° C. (ASTM D-1646) of between about 20 and 90. Examples of the above are Butyl 077, Vistalon 404, Vistalon 3708, Chlorobutyl 1066, respectively, all available from Exxon Chemical Company. Also useful are depolymerized rubbers having a viscosity at 38° C. of between about 40,00 and 400,000 cps. AN example thereof is DPR 75 from Hardman, Inc. of Belleville, N.J.

A composition according to the invention typically comprises between about 77 and about 95% b.w. oil. If a bleed inhibitor is present and the inhibitor is rubber block copolymer, then the oil content typically is between about 90 and about 95% b.w. On the other hand, if the bleed inhibitor is a semiliquid rubber, then the oil content typically is between about 77 and about 91% b.w. The composition further comprises at most 15% b.w., preferably at most 10% b.w., of colloidal particles. If the colloidal particles are fumed silica, then a typical range is from 2 to about 10% b.w., with 5–8% b.w. being currently preferred for some applications. The bleed inhibitor content of the composition is typically between abour 0.5 and 15%, with the currently preferred range for block copolymer rubbers being between about 0.5 and about 5% b.w., and for semiliquid rubbers being between about 3 and about 15% b.w. Optionally, the composition may also comprise minor amounts of oxidative stabilizer and other property-modifying additives. An exemplary stabilizer is tetrakis [methylene 3-(3',5'-dietherbutyl-4'hydroxyphenyl) propionate] methane, available from Ciba-Geigy under the trade designation Irganox 1010. Typically the three major constituents of the inventive composition (i.e., oil, colloidal particles, and, if present, bleed inhibitor) account for about 99% b.w. or more of the total composition.

Colloidal filler particles in oil can gel the oil by forming a network, e.g., by bonding of surface hydroxyl groups. Such gels are capable of supporting a load below a critical value of stress. Above this stress level, the network is disrupted and the material assumes liquid-like character, i.e., it flows under stress. Such behavior is often referred to as thixotropic.

FIG. 1 shows a generalized stress-strain curve at constant strain rate for thixotropic material, and identifies several important parameters. In segment 10 of the stress-strain curve the material acts essentially as an elastic solid. The segment extends from zero stress to the critical yield stress $\sigma_c$. The strain corresponding to $\sigma_c$ is identified as $\gamma_c$, the critical shear strain. By definition, the coordinates $\sigma_c, \gamma_c$ indicate the onset of yielding and the quantity $\sigma_c/\gamma_c$ (or $d\sigma/d\gamma$, for $\sigma < \sigma_c$) is known as the shear modulus ($G_e$) of the material.

The prior art teaches that filling compounds for optical fiber cable need to have low values of $G_e$, and those skilled in the art generally consider the modulus to be a critical parameter of an optical fiber cable filling compound. However, we have discovered that, at least for some applications, a low value of $G_e$ of the filling compound is not sufficient to assure low cabling loss, and that a further parameter also needs to be controlled. This parameter is the critical yield stress $\sigma_c$. We consider the discovery that $\sigma_c$ is a critical parameter of a fiber cable filling compound to be an important aspect of the instant invention, which aided in the formulation of the inventive compositions. For instance, whereas an exemplary single mode fiber cable that was filled with a commercially available grease having a critical yield stress of about 140 Pa had a mean added loss at 1.55 $\mu$m of 0.2 dB/km, a similar cable filled with an exemplary grease composition according to the invention ($\sigma_c \sim 10$ Pa) had essentially zero mean added loss.

Segment 11 of the stress-Strain curve of FIG. 1 represents the regime which shows increasing values of incremental strain for increasing stress. The stress $\sigma_y$ is the maximum value of stress sustainable by the material at a given strain rate, with $\gamma_y$ being the corresponding strain. For strains in excess of $\gamma_y$ the stress at first decreases (segment 12 of the curve), becoming substantially strain-independent for still greater values of strain (segment 13). The material thus exhibits liquid-like behavior for $\gamma > \gamma_y$. Whereas $\sigma_c$ typically is substantially independent of strain rate, $\sigma_y$ is a function of strain rate. For very low strain rates, $\sigma_y$ approaches $\sigma_c$. Thus, for very slow deformations, $\sigma_c$ is the maximum stress.

The inventive grease compositions have very low critical yield stress, as measured, for instance, by means of a cone-and-plate rheometer. Methods for determining the mechanical properties of thixotropic materials are known in the art. Typically, the critical yield stress of material according to the invention is less than about 140 Pa, preferably less than about 70 Pa, and at least for some applications it preferably is below about 35 Pa, all measured at 20° C.

FIG. 2 gives exemplary stress-strain curves at constant strain rate (0.58%/sec) for a prior art grease composition (20) and for two inventive compositions (21 and 22). The exemplary prior art composition is a commercially available grease-like material that is sold for use as an optical fiber cable filling compound by Synco Corporation of Bohemia, N.Y. under the trade designation Syncofox. It was found to have a critical yield stress (at the stated strain rate and at room temperature) of about 140 Pa, and a modulus of about 13 KPa. Curves 21 and 22 were obtained from compositions comprising two previously referred to materials (Drakeol 35, and 8% b.w. and 5% b.w. Cab-O-Sil N70-TS, respectively). The former composition has a $\sigma_c$ of about 18 Pa and a $G_c$ of about 4 KPa, and the latter of about 2 Pa and about 0.5 KPa, respectively.

The mechanical properties of the inventive composition are, inter alia, a function of the colloidal particle content. This is illustrated in FIG. 3, which shows stress-strain curves at constant strain rate (0.57%/sec) of four exemplary compositions. All four materials comprise Drakeol 35, curves 30-33 having been obtained for compositions comprising 8, 7, 6, and 5% b.w. Cab-O-Sil N70-TS, respectively. It is evident that $\sigma_c$ as well as $G_e$ decrease with decreasing particulate content.

Since the mechanical strength of the network formed by the colloidal filler material depends on the average effective number of bonding sites per particle, which in turn is a function of the particle composition, the chemical state of the particle surface, as well as of particle shape, size, and the like, it is not possible to give a universally valid relationship between colloidal particle content and $\sigma_c$, and simple experimentation may be required to find the appropriate percentage of a given colloidal filler.

To illustrate the above point: we have found that a 97.5/2.5% b.w. blend of mineral oil/hydrophilic fumed silica has substantially the same yield stress as a 93/7% b.w. blend of the mineral oil with hydrophobic fumed silica of substantially the same particle size (but the former has much greater bleeding tendency than the latter). It is believed that the hydrophobic material has fewer surface hydroxyl groups than the hydrophilic (untreated) fumed silica, resulting in a network of lower mechanical strength than the network formed by the hydrophilic colloidal particles for a given fumed silica content.

Oil-retention of the inventive greases is improved by means of addition of one or more bleed inhibitors (e.g., rubber polymers) to the oil. We have tested for oil-retention by using a procedure that substantially corresponds to the Rural Electrification Authority (REA) PE-89 oil-retention test. Our procedure comprises removal of core and core wrap from a 12 inch length of air core fiber optic cable ID of cable jacket 0.25 inch). Two 14 inch lengths of standard (12 fiber) optical fiber ribbons are stacked and the stack inserted into the cable, one protruding end of the stack taped to the outside of the cable, and the other protruding end cut off flush with the cable end. The grease to be tested is injected into the "taped" end of the cable. The filled cable is maintained in horizontal position for about 24 hours, and then suspended, taped end up, in an oven at 60° C. or 81° C. After one hour any grease that is protruding, due to differential thermal expansion, is removed. The samples remain in the oven for 24 hours, any dripping oil is collected, and the collected oil weighed at the end of the test period. If any measurable amount of dripped oil is present, the grease composition is considered to have failed the oil-retention test.

We have also used an oil-separation test. The test comprises centrifuging (with International Equipment Company Model HT Centrifuge or equivalent) a 30 gm sample of grease for 60 minutes at 10,000 rpm, and decanting and weighing any separated oil at the end of the test period.

Figure 4:
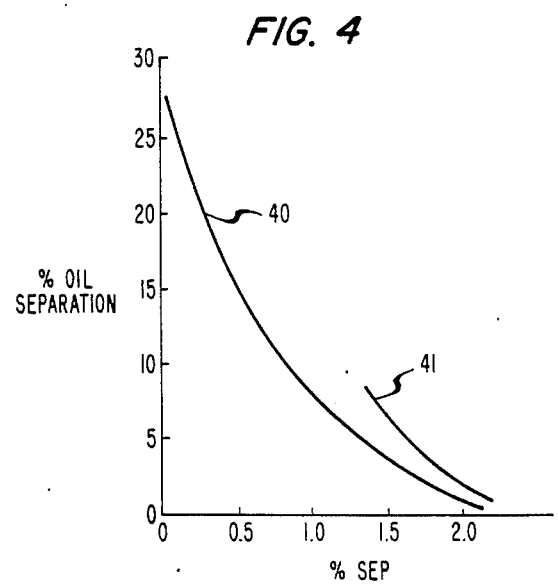
FIG. 4 shows exemplary data on oil separation as a function of the percentage of bleed inhibitor in the composition.

FIG. 4 shows exemplary data on the effect of different amounts of a particular bleed inhibitor (SEP) on two oil/fumed silica mixtures. Oil separation was determined by the above-described centrifuging procedure, and is expressed as percent of the total amount of oil in the composition. Curves 40 and 41 refer to greases comprising 7% and 6% b.w. Cab-O-Sil N70-TS in Drakeol 35, respectively. We currently believe that, in order for the composition to have good oil retention up to about 60° C. or about 80° C., it is desirable that it exhibit at room temperature oil separation not greater than about 7% and about 2.5%, respectively, as determined by the above centrifuge test.

Table I shows the effect of several different bleed inhibitors on oil separation, for two different oils (Drakeol 35 and L-100). The three block copolymer-containing compositions comprise 92% b.w. oil, 6% b.w. Cab-O-Sil N70-TS, and 2% b.w. inhibitor, and the semiliquid rubber-containing compositions comprise 6% b.w. N70-TS, the indicated amounts of inhibitor, and 89 and 84% b.w. of Drakeol 35, respectively.

TABLE I

| | Oil Separation | |
|---|---|---|
| Inhibitor | Drakeol-35 % Separation | L-100 % Separation |
| 2% SEP | 2.5 | 0.7 |
| 2% SEB | 11 | 3.5 |
| 2% SEBS | 5 | 2 |
| 5% LM-MS | 7 | — |
| 10% LM-MS | 2 | — |

Table II shows data an oil separation for several compositions that do not comprise bleed inhibitors. Although increasing the concentration of fumed silica in the oil results in decreasing oil separation, it is evident that addition of a bleed inhibitor is relatively more effective than increasing the colloidal particle content of the composition in preventing oil separation or drip. Since increasing the colloidal particle-content of a grease to the point where syneresis is avoided results in increased critical yield stress, the low values of critical yield stresses needed for at least some optical fiber cable filling compounds may be unobtainable without use of bleed inhibitors. The data of Table II was obtained with N70-TS in Drakeol 35.

TABLE II

| Oil Separation | |
|---|---|
| fumed silica (% b.w.) | oil separation (% b.w.) |
| 6 | 36 |
| 7 | 28 |
| 8 | 20 |
| 10 | 14 |

Exemplary compositions that were studied are shown in Table III:

TABLE III

| | Compositions (parts b.w.) | | | | | | | | | | | | |
|---|---|---|---|---|---|---|---|---|---|---|---|---|---|
| Mat'ls | A | B | C | D | E | F | G | H | I | J | K | L | M |
| Drakeol 35 | 93 | 97.5 | 92.5 | 92 | 92 | 95.5 | | | 92 | 92 | 88 | 83 | 91.5 |
| L-100 | | | | | | | 93 | 92 | | | | | |
| N70-TS | 7.0 | | 6.0 | 6.5 | 6.0 | | 7.0 | 6.0 | 6.0 | 6.0 | 7.0 | 7.0 | 7.0 |
| M5 | | 2.5 | | | | 2.5 | | | | | | | |

TABLE III-continued

| Mat'ls | Compositions (parts b.w.) | | | | | | | | | | | | |
| --- | --- | --- | --- | --- | --- | --- | --- | --- | --- | --- | --- | --- | --- |
| | A | B | C | D | E | F | G | H | I | J | K | L | M |
| Kraton G1701 | | | 1.5 | 1.5 | 2.0 | 2.0 | | 2.0 | | | | | 1.5 |
| Kraton G1657 | | | | | | | | | 2.0 | | | | |
| TRW-7-1511 | | | | | | | | | | 2.0 | | | |
| LM-MS | | | | | | | | | | | 5.0 | 10 | |
| Irganox 1010 | 0.2 | 0.2 | 0.2 | 0.2 | 0.2 | 0.2 | 0.2 | 0.2 | 0.2 | 0.2 | 0.2 | 0.2 | 0.2 |

The compositions were prepared by known methods, typically comprising blending oil, bleed inhibitor, antioxidant, and colloidal particle material first at ambient temperature and pressure, then at ambient temperature under a partial vacuum (typically less than about 300 Torr). Some compositions, e.g., E, were heated to about 150° C. while stirring, and kept at that temperature for about 4 hours.

The resulting compositions were evaluated, including determination of $\sigma_c$ and $G_e$ by means of cone-and-plate rheometry, and oil separation and/or oil-retention tests. An exemplary summary of the properties is presented in Table IV, with the compositions keyed to Table III, and all measurements of $\sigma_c$ and $G_e$ at 22° C.

TABLE IV

| Comp. | (a) | | (b) | | | (c) oil sep. (%) | (d) cable drip | |
| --- | --- | --- | --- | --- | --- | --- | --- | --- |
| | $\sigma_c$ (Pa) | $G_e$ (Pa) | time (hrs) | $\sigma_c$ (Pa) | $G_e$ (Pa) | | (60° C.) | (81° C.) |
| A | 10 | 1793 | 16 | 10 | 1793 | 28 | fail | fail |
| B | 9.4 | 461 | | | | 64 | — | — |
| C | 7.2 | 1540 | 16 | 13 | 1844 | 7.1 | (e) | fail |
| D | 8.1 | 1670 | 16 | 14 | 2000 | 5.7 | pass | fail |
| E | 6.6 | 1700 | 16 | 15 | 1844 | 2.5 | pass | pass |
| F | | | | | | 32 | | |
| G | 8.1 | 1700 | 16 | 17 | 2200 | 7.9 | — | fail |
| H | | | | | | 0.7 | — | pass |
| I | | | | | | 5.0 | — | — |
| J | | | | | | 7.5 | — | — |
| K | | | | | | 6.8 | — | — |
| L | 3.6 | 2000 | 16 | 6.9 | 1800 | 0.8 | pass | pass |
| M | 15 | 2600 | 22 | 27 | 3000 | 3.3 | pass | (e) |

Figure 5:
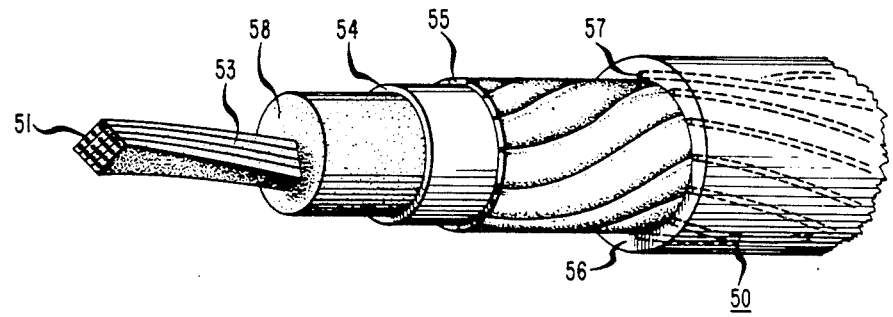
FIG. 5 depicts an exemplary filled optical fiber ribbon cable.
Figure 6:
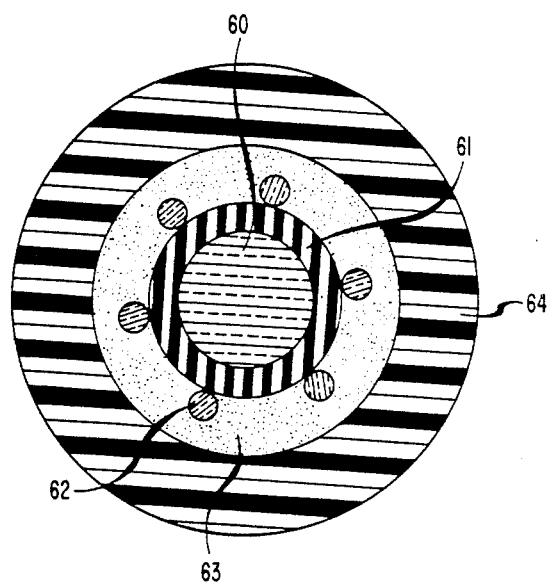
FIG. 6 shows in cross section an exemplary filled stranded optical fiber cable.

(a) no aging
(b) aged for indicated time in measurement fixture
(c) room temperature, centrifuge method
(d) as per criteria discussed in the specification
(e) borderline An important application of the inventive composition is as cable filling compound, especially for optical fiber cable. Filled optical fiber cables are well known in the art. FIG. 5 shows an exemplary filled optical fiber ribbon cable 50, and FIG. 6 depicts an exemplary filled stranded optical fiber cable in cross section. In FIG. 5, optical fiber ribbons 51 are assembled into a multiribbon stack 53, which is surrounded by inner jacket 54 and outer jacket 56, with a bedding layer 55 between inner and outer jacket. Tightly coupled to 56 are strength members 57. The inner jacket contains filling compound 58. Typically, the ribbon stack is helically twisted to provide strain relief in the bent cable.

In FIG. 6, numeral 60 indicates the central strength member 61 is a buffer layer that serves to cushion optical fibers 62. The assembly is surrounded by outer jacket 64, with filling compound 63 substantially filling the available space inside 64. Units of the type shown in FIG. 6 can be used directly or can be assembled into a multi-unit structure as shown in U.S. patent application, Ser. No. 518,145. The cables shown are exemplary only, and other designs are known in the art. The inventive filling compound is considered to be potentially useful with any cable design that is adapted for receiving a filling compound.

Figure 7:
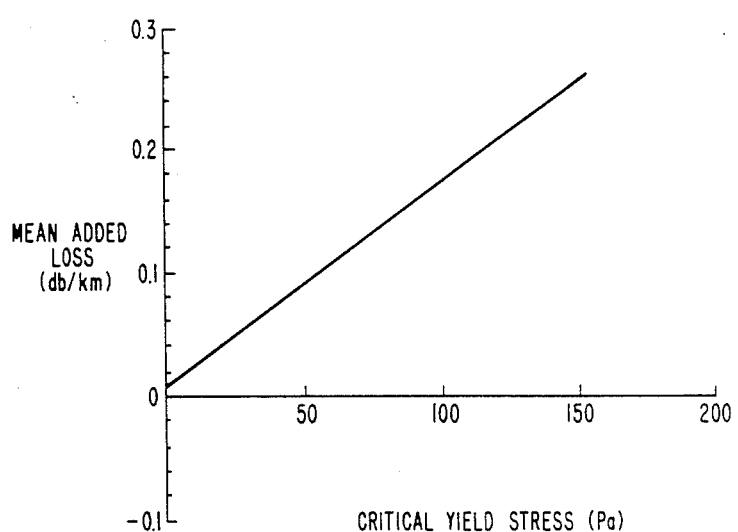
FIG. 7 shows an exemplary curve of mean added loss of optical fiber cable versus critical yield stress of the cable filling compound.

FIG. 7 shows the relationship between mean added cabling loss and critical yield stress of the cable filling compound that was observed to exist in an exemplary type of single mode optical fiber ribbon cable. As can be seen, use of filling compounds according to the invention with $\sigma_c \leq 70$ Pa, resulted in cable typically having a mean added loss less than about 0.1 dB/km. It is to be understood that FIG. 7 is illustrative only, and that different cable designs may show different loss.

EXAMPLE

A 1 km long section of optical fiber ribbon cable was produced by known processes. The cable contained 3 ribbons of twelve fibers each, the fibers were single mode fibers having a mean loss at 1.55 μm of 0.23 dB/km (before cabling), with a standard deviation of ±0.05 dB/km. The cable design was substantially as shown in FIG. 5. The cable was filled with a filling compound having composition A of Table III and $\sigma_c$ of about 10 Pa. After cabling, the fiber loss at 1.55 μm was again measured. The mean added loss was found to be essentially unchanged (0.22 dB/km, with a standard deviation of ±0.04 dB/km).

Among currently preferred compositions for single mode optical fiber cable filling compounds according to the invention are A, E, and L of Table III. We generally have prepared the compositions within variations of ±1.0% b.w. for the oil, ±0.2% b.w. for the colloidal particle filler, ±0.2% b.w. for the inhibitor, and ±0.1% b.w. for the antioxidant. However, other limits may also be acceptable. For other applications of the inventive grease, different compositions may be more advantageous, and persons of skill in the art will be able to select proper components and formulation ranges based on the principles and results disclosed herein. All such variations are considered to be within the spirit and scope of the present invention.

What is claimed is:

1. An article of manufacture comprising a filling material contained within a sheath, CHARACTERIZED IN THAT the filling material comprises
   (a) 77 to 95% b.w. of oil, or mixture of oils, selected from the class consisting of
      (i) ASTM type 103, 104A, or 104B paraffinic or naphthenic oil having a minimum specific gravity of about 0.86 and a pour point (ASTM D97) of less than $-4°$ C.,
      (ii) polybutene oil of minimum specific gravity of about 0.83 and a pour point (ASTM D97) of less than 18° C.,
      (iii) triglyceride-based vehetable oil,
      (iv) polypropylene oil,
      (v) chlorinated paraffin oil having a chlorine content between about 30 and 75% b.w. and a viscosity at 25° C. of between 100 and 10,000 cps, and
      (vi) polymerized esters;
   (b) 2 to 15% b.w. colloidal particles selected from the class consisting of hydrophobic fumed silica, precipitated silica, and clay, the colloidal particles having a BET surface area in the range from about 50 to about 400 m$^2$/g;
   the filling material having a critical yield stress of less than 140 Pa at 20° C.

2. Article of manufacture of claim 1, wherein the article is a cable comprising one or more optical fibers contained within a sheath leaving voids between the fibers and the sheath, and the filing material at least partially filling the voids.

3. Cable of claim 2, wherein the oil is substantially selected from the group consisting of ASTM type 103, 104A, and 104B paraffinic and naphthenic oils and polybutene oils; the colloidal particles are substantially selected from the group consisting of hydrophobic fumed silica and hydrophilic fumed silica; and the filling material has a critical yield stress that is less than about 70 Pa at 20° C.

4. Cable of claim 3, wherein the filling material has a shear modulus less than 13 KPa at 20° C.

5. An article of manufacture according to claim 1, wherein the filling material further comprises up to 15% b.w. of bleed inhibitor selected from the class consisting of styrene-rubber and styrene-rubber-styrene block copolymers having a styrene/rubber ratio between about 0.1 and 0.8, semiliquid rubber having a Flory molecular weight between 20,000 and 70,000, butyl rubber, ethylene-propylene rubber, ethylene-propylene dimer rubber, chlorinated butyl rubber having a Mooney viscosity at 100° C. (ASTM D-1646) between about 20 and 90, and depolymerized rubber having a viscosity at 38° C. between about 40,000 and 400,000 cps, with the oil, the colloidal particles, and the bleed inhibitor making up at least 99% b.w. of the filing material, and the filling material has a critical yield stress of less than 140 Pa at 20° C.

6. Article of manufacture of claim 5, wherein the article is a cable comprising one or more optical fibers contained within a sheath leaving voids between the fibers and the sheath, and the filling material at least partially filling the voids.

7. Cable of claim 6, wherein the oil consists substantially of oil selected from the group consisting of ASTM type 103, 104A, and 104B paraffinic and naphthenic oils and polybutene oils; the colloidal particles consist substantially of particles selected from the group consisting of hydrophobic fumed silica and hydrophilic fumed silica; the bleed inhibitor consists substantially of inhibitor selected from the class consisting of styrene-rubber and styrene-rubber-styrene block copolymers and semiliquid rubber; and the filling material has a critical yield stress that is less than about 70 Pa at 20° C.

8. Cable of claim 7, wherein the filling material has a shear modulus less than 13 KPa at 20° C.

9. Cable of claim 8, wherein the filling material comprises between about 2 and about 10% b.w. of hydrophobic fumed silica.

10. A cable comprising one or more optical fibers contained within a sheath leaving voids between the fibers and the sheath, and a filling material at least partially filling the voids, CHARACTERIZED IN THAT the filling material has a critical yield stress at 20° C. that is at most 35 Pa.

11. Cable of claim 10 wherein the filling material comprises
    (a) 77 to 95% b.w. of oil, or mixture of oils, selected from the class consisting of
       (i) ASTM type 103, 104A, or 104B paraffinic or naphthenic oil having a minimum specific gravity of about 0.86 and a pour point (ASTM D97) less than $-4°$ C.; and
       (ii) polybutene oil of minimum specific gravity of about 0.83 and pour point (ASTM D97) less than 18° C.; and
    (b) 2 to 15% b.w. colloidal particles consisting substantially of hydrophobic fumed silica.

* * * * *